US012781547B2

(12) United States Patent
Kim et al.

(10) Patent No.: US 12,781,547 B2
(45) Date of Patent: Nov. 3, 2026

(54) DOOR LATCH DEVICE FOR VEHICLE

(71) Applicants: Hyundai Motor Company, Seoul (KR); Kia Corporation, Seoul (KR); PHA CO., LTD., Daegu (KR)

(72) Inventors: Hyong Don Kim, Yongin-Si (KR); Dong Hee Ma, Hwaseong-Si (KR); Jinwoo Nam, Seoul (KR); Hyun Duk Cho, Daegu (KR); Ki-Ryun Ahn, Daegu (KR)

(73) Assignees: Hyundai Motor Company, Seoul (KR); Kia Corporation, Seoul (KR); PHA CO., LTD., Daegu (KR)

( * ) Notice: Subject to any disclaimer, the term of this patent is extended or adjusted under 35 U.S.C. 154(b) by 364 days.

(21) Appl. No.: 18/389,551

(22) Filed: Nov. 14, 2023

(65) Prior Publication Data

US 2024/0218713 A1 Jul. 4, 2024

(30) Foreign Application Priority Data

Dec. 29, 2022 (KR) ........................ 10-2022-0189285

(51) Int. Cl.
*E05B 83/38* (2014.01)
*B60J 5/04* (2006.01)
*E05B 85/04* (2014.01)

(52) U.S. Cl.
CPC ............. *E05B 83/38* (2013.01); *B60J 5/0479* (2013.01); *E05B 85/04* (2013.01); *E05Y 2900/531* (2013.01)

(58) Field of Classification Search
CPC .......... E05B 83/38; E05B 85/04; E05B 85/26; E05B 83/36; E05B 63/143; E05B 85/00; E05B 15/0205; E05B 81/15; E05B 77/46; B60J 5/0479; E05Y 2900/531
See application file for complete search history.

(56) References Cited

U.S. PATENT DOCUMENTS

2016/0348409 A1* 12/2016 Choi ........................ E05B 83/40
2018/0274272 A1* 9/2018 Woo ........................ E05B 77/46
2019/0077233 A1* 3/2019 Ma .......................... E05D 15/28
2023/0203855 A1* 6/2023 Kim ........................ E05B 85/26
292/200
2023/0203863 A1* 6/2023 Yun ......................... E05D 3/022
16/233
2024/0218713 A1* 7/2024 Kim ........................ E05B 83/38

* cited by examiner

*Primary Examiner* — Kristina R Fulton
*Assistant Examiner* — Thomas L Neubauer
(74) *Attorney, Agent, or Firm* — MORGAN, LEWIS & BOCKIUS LLP

(57) ABSTRACT

A door latch device for a vehicle applied to a vehicle without a B-pillar, includes a latch portion, a pop-up guide portion, and a rebound locking portion including a locking claw lever, a locking pawl lever and a locking pawl link lever on the pop-up guide portion, so that, when a door is subjected to a closing operation by a swing operation, a striker is locked with the locking claw lever to prevent the door from rebounding.

12 Claims, 17 Drawing Sheets

(S1)

(S2)

(S3)

(S4)

(ST1)

(ST2)

(ST3)

(ST4)

(ST5)

(ST6)

(ST7)

(ST8)

(ST9)

(ST11)

(ST12)

(ST13)

(ST14)

(ST15)

(ST16)

(ST17)

(ST18)

DOOR LATCH DEVICE FOR VEHICLE

CROSS-REFERENCE TO RELATED APPLICATION

The present application claims priority to Korean Patent Application No. 10-2022-0189285 filed on Dec. 29, 2022, the entire contents of which is incorporated herein for all purposes by this reference.

BACKGROUND OF THE PRESENT DISCLOSURE

Field of the Present Disclosure

The present disclosure relates to a door latch device for a vehicle, and more particularly, to a door latch device for a vehicle that prevents rebound when a door is closed by a swing motion in a vehicle without a B-pillar.

Description of Related Art

In general, a vehicle door is a door that separates the inside and the outside of the vehicle. The vehicle door blocks external noise, rain, dust, wind, etc., and in case of a side surface collision, provides an important function of absorbing impact together with a side structure to safely protect an occupant.

There are various types of vehicle doors, including special-purpose doors, but hinge-type swing doors are most often applied to passenger vehicles.

In general, a swing door refers to a door that opens toward the outside of the vehicle body around a hinge shaft provided between the door and the vehicle body through a hinge bracket, and has advantages of easy opening/closing and simple structure providing easy maintenance and repair.

On the other hand, some vehicles are applied with opposite swing doors, which include a large open feeling when the door is opened and is advantageous for occupants to get on or off the vehicle.

These opposite swing doors include a type without a B-pillar and a type with a B-pillar.

FIG. 1 is a side view of a vehicle to which opposite swing doors according to an example of the related art are applied. FIG. 2 is a cross-sectional view showing a part in which a front door and a rear door meet each other in the vehicle of FIG. 1.

Referring to FIG. 1 and FIG. 2, an example of opposite swing doors applied to a vehicle without a B-pillar is particularly referred to. A front door 110 has a hinge shaft provided at a vehicle body 100 and a front end portion of the front door 110, and a rear door 120 has a hinge shaft provided at the vehicle body 100 and a rear end portion of the rear door 120.

A latch part LC for maintaining a locked state is provided on one side of the front door 110 or the rear door 120 in the opposite swing doors.

Furthermore, a sealing S for airtightness is provided between a rear end portion of the front door 110 and a front end portion of the rear door 120.

As described above, the opposite swing doors of the vehicle without a B-pillar has good open feeling when the passengers get on/off or in leisure activities. However, there is a drawback in that an opening/closing sequence is preset so that the front door 110 must first be opened or closed before or after opening or closing the rear door 120, due to overlapping interference of rotation trajectories of the front door 110 and the rear door 120 when opening/closing the front door 110 and the rear door 120.

Therefore, because the opening/closing sequence of the front door 110 and the rear door 120 is preset, there is a problem in that the rear door 120 cannot be opened or closed alone.

To solve the problem of the opposite swing doors on a vehicle without a B-pillar, a recent trend is to allow the rear door to open or close in a double motion consisting of a pop-up and a swing operation via a hinge part.

FIG. 3 is a plan view for showing a door opening/closing operation by a double motion of opposite swing doors according to an example of the related art.

Referring to FIG. 3, for convenience of understanding, the double motion is described with reference to an example where a hinge part 130 for implementing a double motion is applied to the front door 110 at the front of the vehicle and the rear door 120 at the rear of the vehicle.

A step S1 of FIG. 3 shows a state in which the rear door 120 is closed, a step S2 of FIG. 3 shows a pop-up operation in which the rear door 120 moves toward the rear and outside of a vehicle body 100 by sliding by the hinge part 130, a step S3 of FIG. 3 shows a swing operation in which the rear door 120 rotates around the hinge part 130 after completing the pop-up operation, and a step S4 of FIG. 3 indicates a state in which the rear door 120 is fully opened.

FIG. 4 is a perspective view of a rear door of opposite swing doors according to an example of the related art. FIG. 5 shows operating states by stages for describing problems of a door latch device for a vehicle according to an example of the related art.

Referring to FIG. 4, the rear door 120 of the opposite swing doors has a door latch device 140 configured on a front lower side.

That is, the door latch device 140 operates on a striker 150 fixed to one side of a vehicle body to keep the door locked.

Referring to FIG. 5, the door latch device 140 includes a striker 150 fixed to one side of the vehicle body, a latch part 160 which is configured on a lower side of a door and restrains or releases the striker 150 through a claw lever 163 and a pawl lever 165 on a body 161, and a pop-up guide part 170 having first and second guiders 173 and 175 integrally formed to form a guide groove 171 at a set angle on one side of the body of the latch part 160 to guide the lower side of the door by the striker 150 at a time of a pop-up operation of the door.

In the instant case, a switch 179 and a switch lever 177 for checking whether a swing operation of the door is completed may be configured on the first guider 173 of the pop-up guide part 170.

As described above, in the door latch device 140 according to the related art, as shown in step S11 of FIG. 5, during a swing closing operation of the door, the striker 150 actuates the switch 179 through the switch lever 177 to recognize that the swing closing operation of the door has been completed, as shown in step S12 of FIG. 5.

However, when the door is slammed with excessive force, an abnormal state may be caused in which the door is rebounded from the striker 150 and thrown out by repulsive force of a weather strip or the like and the striker 150 is not located in the guide groove 171 of the pop-up guide part 170.

Nevertheless, a controller recognizes that the swing closing operation of the door has been completed and abnormally proceeds with a pop-up operation, causing problems such as damage to the door latch device 140, the hinge part 130 or the door.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door latch device for a vehicle in which a rebound locking portion including a locking claw lever, a locking pawl lever and a locking pawl link lever is configured on a pop-up guide portion of a vehicle without a B-pillar and when a door is closed with a swing operation, a striker into which the locking claw lever is introduced is locked to prevent the door from rebounding.

One or more exemplary embodiments of the present disclosure provides a door latch device for a vehicle including: a striker fixed to a vehicle body corresponding to one side of a lower portion of a door configured to be opened or closed by a double motion of a pop-up operation and a swing operation through a hinge portion; a latch portion provided on one side of the lower portion of the door and configured to restrain or release the striker through a claw lever and a pawl lever on a body; a pop-up guide portion integrally formed by forming a guide groove at a predetermined angle on one side of the body of the latch portion to guide one side of the lower portion of the door by the striker at a time of the pop-up operation of the door; and a rebound locking portion provided on the pop-up guide portion, including a locking claw lever, a locking pawl lever, and a locking pawl link lever, and configured, when the striker enters the pop-up guide portion while the door is closed by the swinging operation, to lock the striker in a rebound direction by the locking claw lever.

That is, the rebound locking portion may include the locking claw lever including a locking end portion rotatably coupled to one side of the pop-up guide portion, formed on a first side and configured to lock the striker, a locking engagement end portion formed on a second side and configured to restrict one-way rotation, and a guide end portion formed on one side between the locking end portion and the locking engagement end portion and configured to guide the pop-up operation of the striker while suppressing one-way rotation; the locking pawl lever including a locking support end portion rotatably coupled to the other side of the pop-up guide portion in correspondence with one side of the locking claw lever, formed on one side and configured to act on the locking engagement end portion, and a locking protrusion end portion formed on the other side and configured to suppress one-way rotation, a locking release pin being downward fixed to an end face of the locking pawl lever; and the locking pawl link lever including one side protruding into the guide groove of the pop-up guide portion to be actuated by the striker, rotatably coupled to the other side of the pop-up guide portion together with the locking pawl lever, and including a slot formed on an end face, a tip end portion of the locking release pin being located in the slot.

Here, the locking claw lever may include a locking groove formed between the locking end portion and the guide end portion and facing an entrance of the guide groove.

Furthermore, the locking claw lever may include a switch actuating end portion protruding on an opposite side to the locking end portion and configured to actuate a switch on the pop-up guide portion.

The rebound locking portion may further include a locking claw spring fitted to a pin of the locking claw lever and configured to elastically support the locking claw lever in both directions; a locking pawl spring fitted to a pin of the locking pawl lever and configured to elastically support the locking pawl lever in a direction in which the locking support end portion of the locking pawl lever supports the locking engagement end portion of the locking claw lever; and a locking pawl link spring fitted to the pin of the locking pawl lever and configured to elastically support the locking pawl link lever in a direction in which one side of the locking pawl link lever protrudes into the guide groove.

The locking claw spring may be configured, in a state of being fitted to the pin of the locking claw lever, to be supported at both end portions thereof by a first spring bracket on the pop-up guide portion and to elastically support the locking claw lever in both directions by a spring actuating pin on the locking claw lever corresponding to a portion between both end portions.

Furthermore, the locking pawl spring may be configured, in a state of being fitted to the pin of the locking pawl lever, to be supported at one end portion by a second spring bracket on the pop-up guide portion and to elastically support the locking protrusion end portion on the locking pawl lever by the other end portion.

Furthermore, the locking pawl link spring may be configured, in a state of being fitted to the pin of the locking pawl lever, to be supported at one end portion on the pop-up guide portion, and to elastically support the locking pawl link lever by the other end portion fitted through an end face on the locking pawl link lever.

The rebound locking portion may further include a locking claw damper provided to the pop-up guide portion to support the guide end portion of the locking claw lever and to suppress rotation; and a locking pawl damper provided to the pop-up guide portion to support the locking protrusion end portion of the locking pawl lever and suppress rotation.

The rebound locking portion may be configured so that the locking pawl link lever is formed not to protrude into the guide groove of the pop-up guide portion, is rotatably coupled to the other side of the pop-up guide portion together with the locking pawl lever, is formed on an end face with a slot in which the tip portion end portion of the locking release pin is located is formed, and is able to be rotationally actuated by a locking handle wire connected to one side thereof.

Furthermore, one side of the lower portion of the door may be formed as one side of a front of a lower portion of a rear door.

According to the exemplary embodiment of the present disclosure, the rebound locking portion is configured by the locking claw lever, the locking pawl lever and the locking pawl link lever on the pop-up guide portion in a vehicle without a B-pillar, whereby, when a door is closed with the swing operation, the locking end portion on the locking claw lever locks the striker to prevent the door from rebounding.

Even when the door is slammed with excessive force, a normal pop-up closing operation may be performed while the striker slides along the guide groove of the pop-up guide portion in a state of being locked in the locking groove of the locking claw lever.

Accordingly, damage to the door latch device, the hinge portion or the door due to an abnormal operation such as a rebound phenomenon of a swing door of the related art may be prevented.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
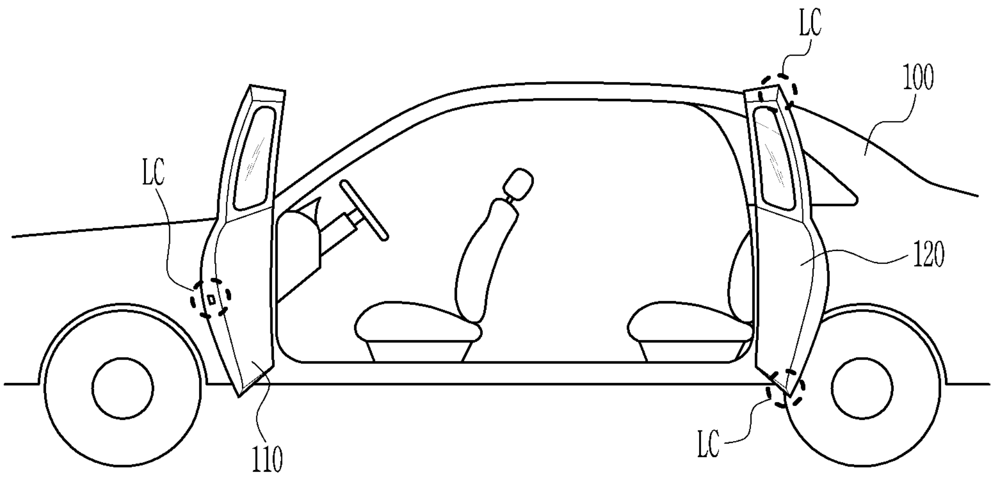
FIG. 1 is a side view of a vehicle to which opposite swing doors according to an example of the related art are applied.
Figure 2:
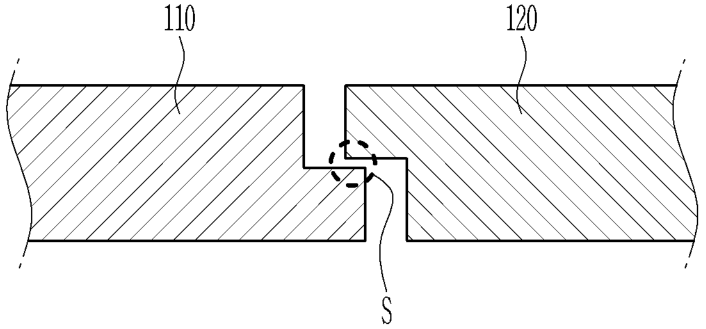
FIG. 2 is a cross-sectional view showing a portion in which a front door and a rear door meet each other in the vehicle of FIG. 1.
Figure 3:
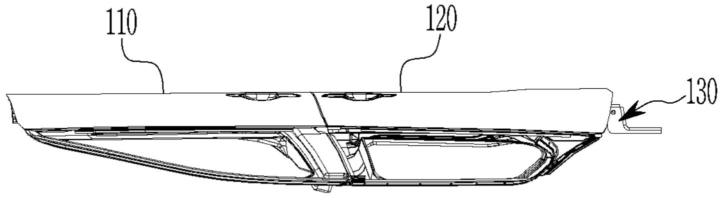
FIG. 3 is a plan view for showing a door opening/closing operation by a double motion of opposite swing doors according to an example of the related art.
Figure 3:
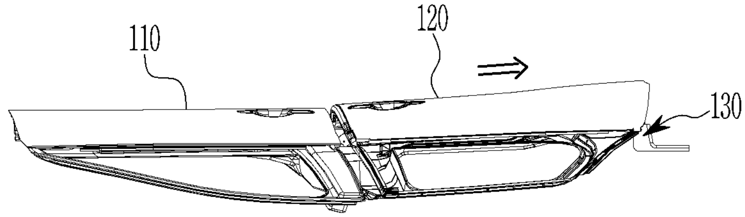
Figure 3:
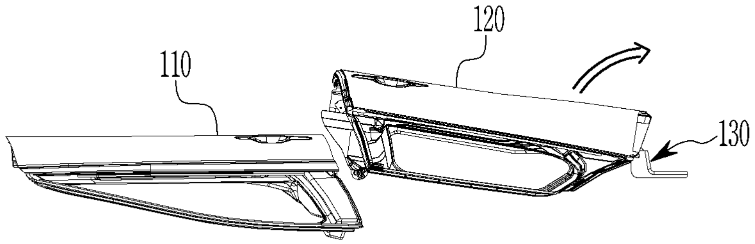
Figure 3:
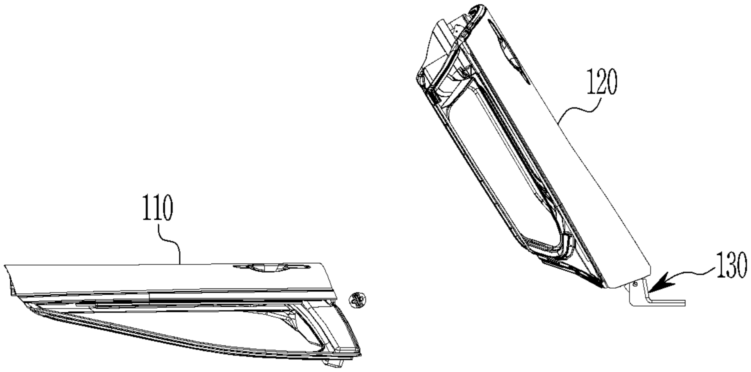
Figure 4:
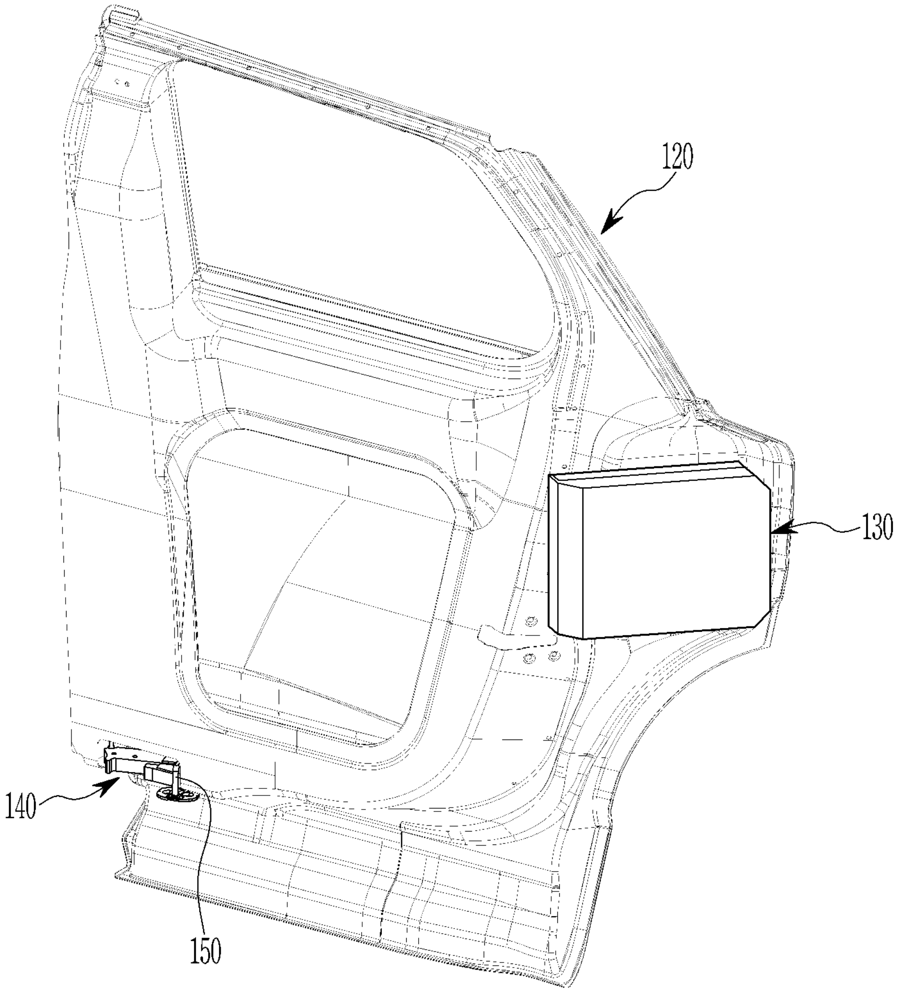
FIG. 4 is a perspective view of a rear door of opposite swing doors according to an example of the related art.
Figure 5:
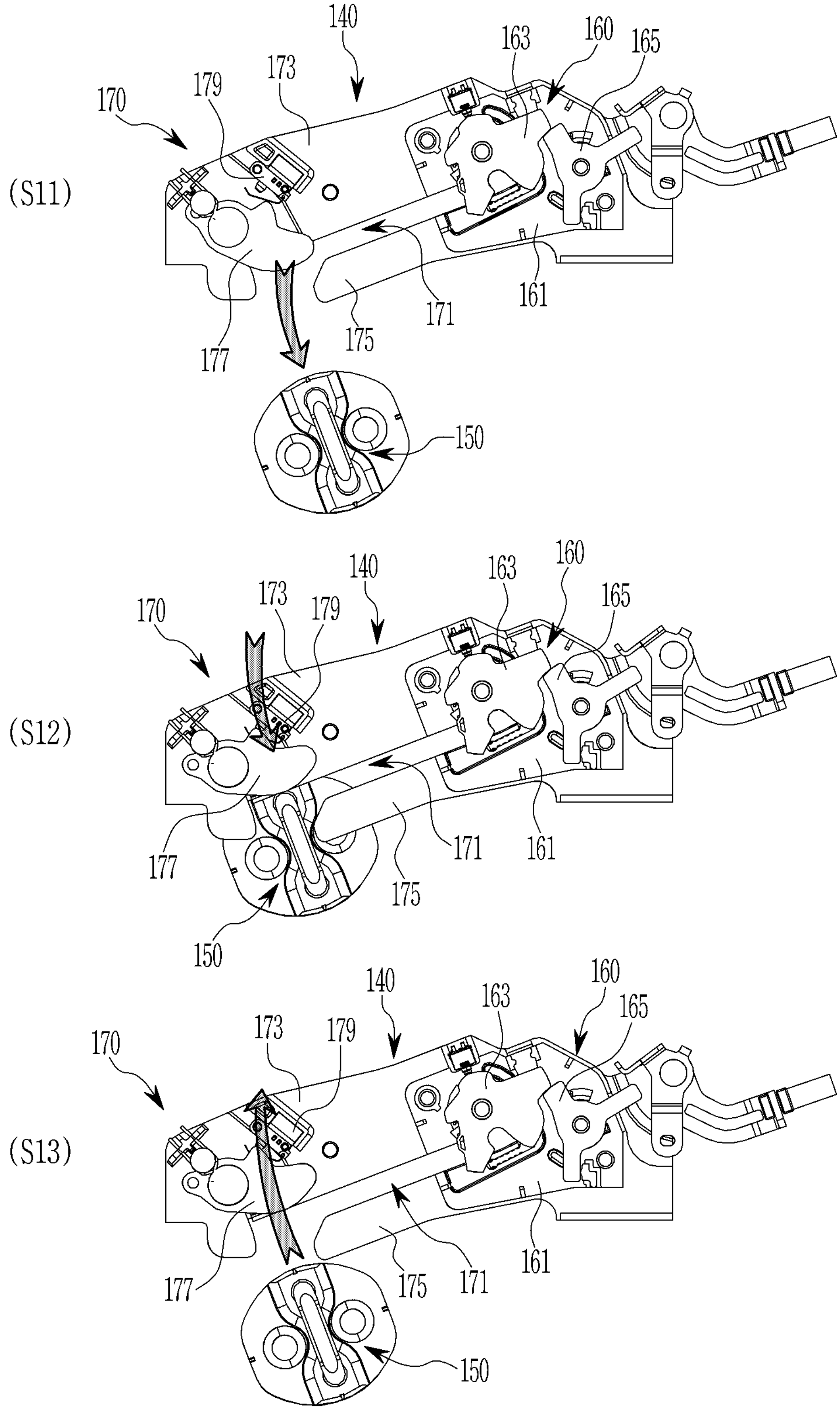
FIG. 5 shows operating states by stages for describing problems of a door latch device for a vehicle according to an example of the related art.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings.

The size and thickness of each configuration shown in the drawings are arbitrarily shown for understanding and ease of description, but the present disclosure is not limited thereto. In the drawings, the thickness of layers, films, panels, regions, etc., are exaggerated or reduced for clarity. Furthermore, the drawings and description are to be regarded as illustrative in nature and not restrictive.

Figure 6:
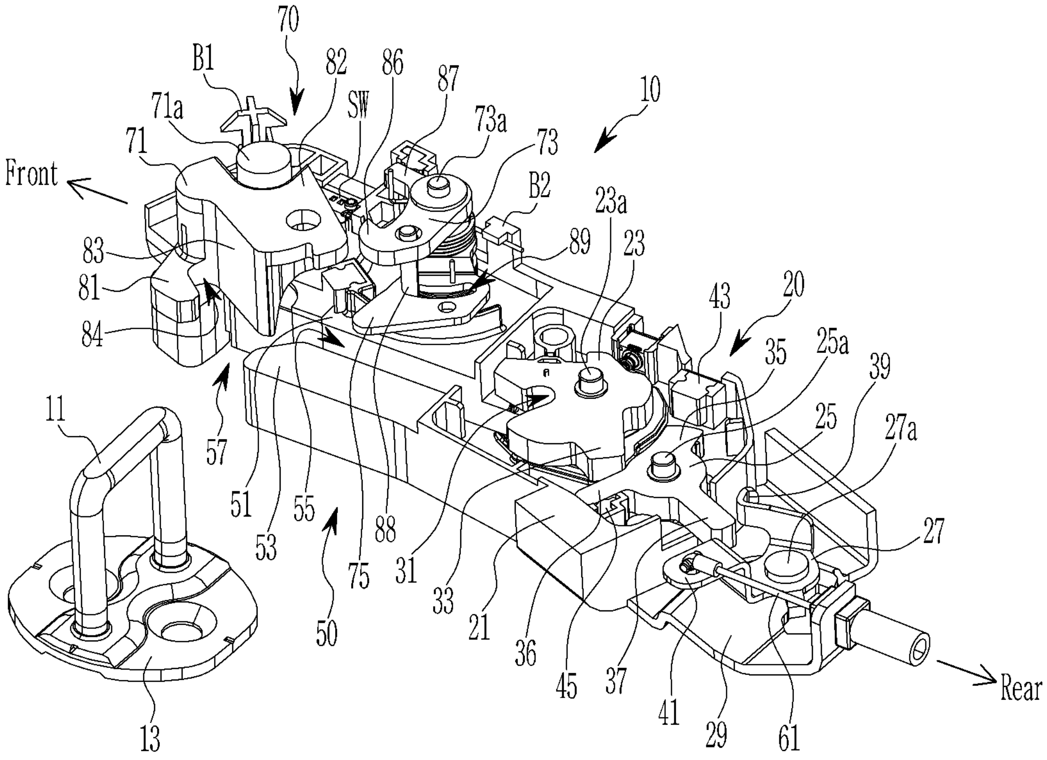
FIG. 6 and FIG. 7 are perspective views of a door latch device for a vehicle according to various exemplary embodiments of the present disclosure.

In describing exemplary embodiments of the present disclosure, for convenience of the description, a left upper portion of FIG. 6 is defined as the front and a right lower portion is defined as the rear. Furthermore, a door latch device for a vehicle according to an exemplary embodiment of the present disclosure is provided in rear doors on both sides at the rear of a driver seat and a front passenger seat of a vehicle. In an exemplary embodiment of the present disclosure, an example where a door latch device for a vehicle is applied to the rear door behind the front passenger seat will be described.

Figure 7:
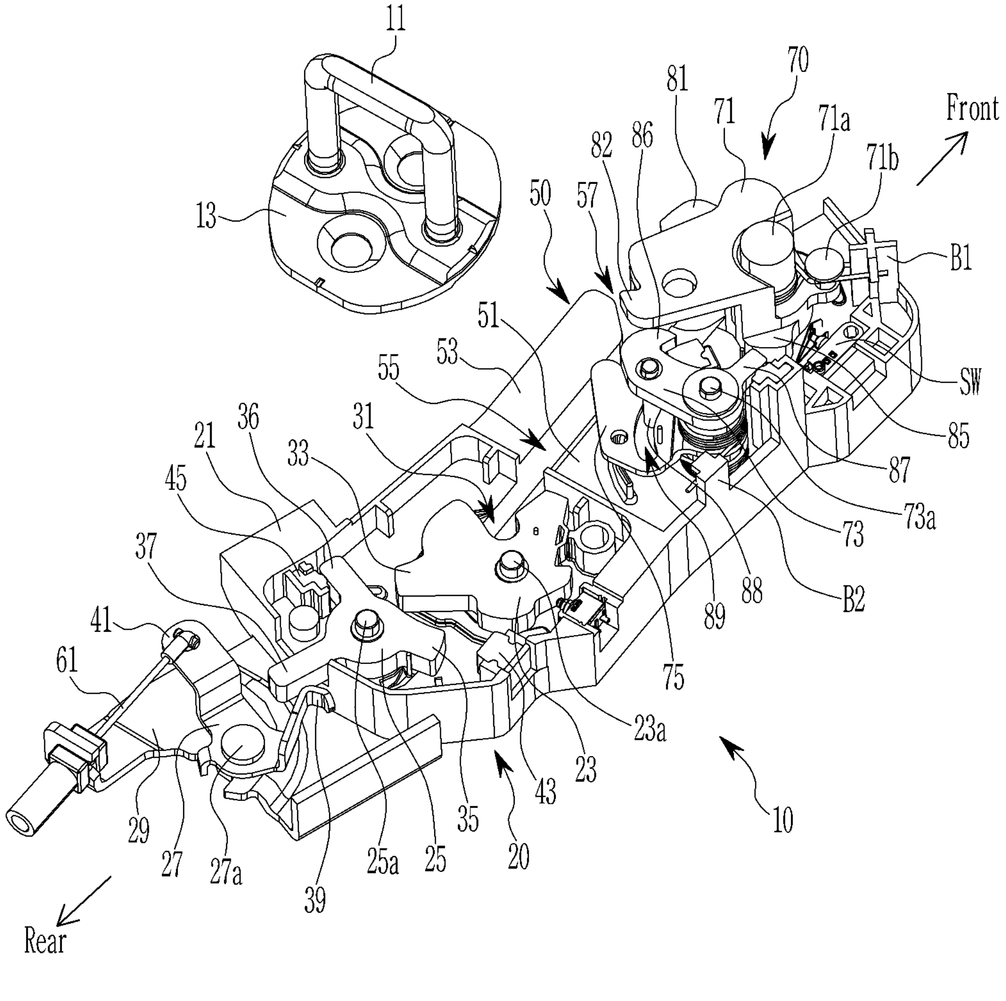
Figure 8:
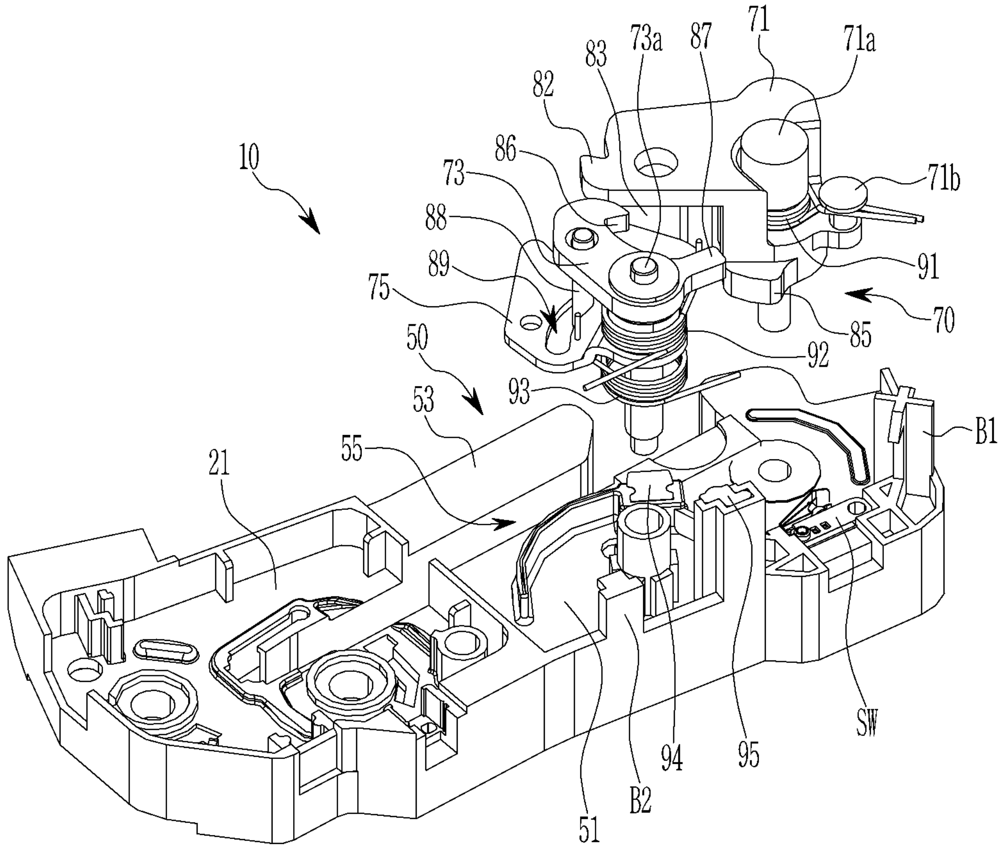
FIG. 8 is a perspective view of a rebound locking portion applied to the door latch device for a vehicle according to the various exemplary embodiments of the present disclosure.

FIG. 6 and FIG. 7 are perspective views of a door latch device for a vehicle according to various exemplary embodiments of the present disclosure. FIG. 8 is a perspective view of a rebound locking portion applied to the door latch device for a vehicle according to the various exemplary embodiments of the present disclosure.

A door latch device 10 for a vehicle according to the various exemplary embodiments of the present disclosure may be applied to a rear door of a passenger vehicle without a B-pillar. That is, the door latch device may be configured between one side of the front of a lower portion of a rear door, which is opened or closed by a double motion of a pop-up operation and a swing operation through a hinge portion, and a vehicle body corresponding thereto.

Referring to FIGS. 6 to 8, the door latch device 10 for a vehicle according to the various exemplary embodiments of the present disclosure may include a striker 11, a latch portion 20, a pop-up guide portion 50 and a rebound locking portion 70.

The striker 11 is fixed to the vehicle body through a bracket 13, in correspondence with one side of the front of a lower portion of the rear door which is opened or closed by a double motion of a pop-up operation and a swing operation through a hinge portion.

The latch portion 20 is provided on one side of the front of the lower portion of the rear door and is configured for restraining or releasing the striker 11 through a claw lever 23 and a pawl lever 25 on a body 21 to allow a closed state of the rear door to be maintained or the rear door to be opened.

The latch portion 20 includes a body 21, a claw lever 23, a pawl lever 25, and an actuating lever 27.

That is, the latch portion 20 is provided in a cutout portion formed on one side of the front of a lower portion of an internal panel of the rear door, and is configured to act on the striker 11 on the vehicle body.

The body 21 is fixed inside the cutout portion formed on one side of the front of the lower portion of the rear door, and a connecting bracket 29 is assembled to a lower portion of the body.

The claw lever 23 is rotatably provided on the body 21 through a first pin 23*a*, in correspondence with the pop-up guide portion 50.

Furthermore, the claw lever 23 includes a restraining groove 31 for restraining the striker 11 on one side and a protruding engagement end portion 33 for restricting one-way rotation on the other side thereof.

The pawl lever 25 is rotatably provided on the body 21 through a second pin 25*a*, in correspondence with one side of the claw lever 23.

Furthermore, the pawl lever 25 includes a support end portion 35 acting on the engagement end portion 33 on one side and a protruding release end portion 37 on the other side thereof.

Furthermore, the pawl lever 25 includes a protrusion end portion 36 that protrudes on an opposite side to the support end portion 35 and the release end portion 37 and suppresses one-way rotation of the pawl lever 25.

The actuating lever 27 is rotatably provided on the connecting bracket 29 fixed to the lower portion of the body 21, through a third pin 27*a*.

Furthermore, the actuating lever 27 includes an actuating end portion 39 that acts on the release end portion 37 of the pawl lever 25 and is formed on one side and a connecting end portion 41 which is connected to a latch handle wire 61 and is formed on the other side thereof.

The latch portion 20 further includes a claw damper 43, a pawl damper 45, a claw spring, and a pawl spring.

The claw damper 43 is provided on one side of the body 21, in correspondence with one side of the engagement end portion 33 of the claw lever 23, and supports one side surface of the engagement end portion 33 of the claw lever 23 to suppress one-way rotation while reducing contact noise.

The pawl damper 45 is provided on the other side of the body 21, in correspondence with one side of the protrusion end portion 36 of the pawl lever 25, and supports the protrusion end portion 36 of the pawl lever 25 to suppress one-way rotation while reducing contact noise.

The claw spring may be fitted to the first pin 23*a* of the claw lever 23 and provided to elastically support the claw lever 23 in a direction of releasing the restraint of the striker 11, at the lower portion of the body 21.

The pawl spring may be fitted to the second pin 25*a* of the pawl lever 25 and provided to elastically support the pawl lever 25 in a direction in which the support end portion 35 of the pawl lever 25 supports the engagement end portion 33 of the claw lever 23, at the lower portion of the body 21.

The pop-up guide portion 50 is integrally formed on one side of the front of the body 21 of the latch portion 20 to guide one side of the front of the lower portion of the rear door by the striker 11 during a pop-up operation of the rear door.

That is, the pop-up guide portion 50 includes a first guider 51 integrally formed on one side of the front of the body 21, and a second guider 53 integrally formed on the other side of the front of the body 21 while forming a guide groove 55 including a predetermined interval between the first guider 51 and the second guider 53.

The guide groove 55 is formed so that an interval of an entrance 57 between the first and second guiders 51 and 53 is greater than the predetermined interval of the guide groove 55 and the striker 11 can easily enter.

Here, the first guider 51 is formed to be longer than the second guider 53 so that the entrance 57 into which the striker 11 is introduced is directed toward the outside of the vehicle body.

The rebound locking portion 70 is formed on the pop-up guide portion 50 to prevent the rear door from rebounding from the striker 11 and being thrown out even when unnecessarily great force is applied when the rear door is closed with a swing operation.

The rebound locking portion 70 includes a locking claw lever 71, a locking pawl lever 73, and a locking pawl link lever 75. That is, when the striker 11 is introduced into the pop-up guide portion 50 while the rear door is closed with a swing operation, the locking claw lever 71 locks the striker 11 to prevent the striker from separating in a rebound direction thereof.

The locking claw lever 71 is rotatably provided on one side of the front of the first guider 51 of the pop-up guide portion 50 through a fourth pin 71*a*.

The locking claw lever 71 is formed on one side with a locking end portion 81 for locking the striker 11 and is formed on the other side with a locking engagement end portion 82 for restricting one-way rotation.

Furthermore, the locking claw lever 71 includes a guide end portion 83 formed on one side between the locking end portion 81 and the locking engagement end portion 82 to guide the pop-up operation of the striker 11 while suppressing one-way rotation.

Here, the locking claw lever 71 includes a locking groove 84 formed between the locking end portion 81 and the guide end portion 83 and facing the entrance 57 of the guide groove 55 of the pop-up guide portion 50, and therefore, is configured to lock the striker 11 when the striker enters.

Furthermore, the locking claw lever 71 includes a switch actuating end portion 85 formed protruding on an opposite side to the locking end portion 81, and the switch actuating end portion 85 actuates a switch SW provided on the first guider 51 of the pop-up guide portion 50 to allow a swing operation of the striker 11 to be recognized as completed.

The locking pawl lever 73 is rotatably provided on the other side of the first guider 51 of the pop-up guide portion 50 through a fifth pin 73*a*, in correspondence with one side of the locking claw lever 71.

The locking pawl lever 73 includes a locking support end portion 86 formed protruding on one side and acting on the locking engagement end portion 82 and includes a locking protrusion end portion 87 formed protruding on the other side and suppressing one-way rotation.

Furthermore, a locking release pin 88 is downward fixed to an end face of the locking pawl lever 73.

The locking pawl link lever 75 is formed so that one side protrudes into the guide groove 55 of the pop-up guide portion 50 to be actuated by the pop-up closing operation with respect to the striker 11, and is rotatably provided on the other side of the first guider 51 of the pop-up guide portion 50 through the fifth pin 73*a*, together with the locking pawl lever 73.

The locking pawl link lever 75 is formed on an end face with a slot 89 in which a tip end portion of the locking release pin 88 is located.

That is, when the locking pawl link lever 75 is pushed backward and rotated by the striker 11 during the pop-up closing operation of the rear door, the locking release pin 88 comes into contact with an internal end portion of the slot 89 to rotate the locking pawl lever 73 in the same direction as the locking pawl link lever 75.

Conversely, when the locking pawl link lever 75 is pushed forward and rotated by the striker 11 during the pop-up opening operation of the rear door, the locking release pin 88 moves for a certain section inside the slot 89 without the rotation of the locking pawl lever 73.

The rebound locking portion 70 further includes a locking claw spring 91, a locking pawl spring 92, and a locking pawl link spring 93.

The locking claw spring 91 is fitted to the fourth pin 71*a* of the locking claw lever 71 to elastically support the locking claw lever 71 in both directions.

Both end portions of the locking claw spring 91 are supported by a first spring bracket B1 formed on the first guider 51 of the pop-up guide portion 50, and a spring actuating pin 71*b* is configured on the locking claw lever 71 corresponding to a portion between both end portions.

That is, both end portions of the locking claw spring 91 act on the spring actuating pin 71*b* according to a rotation direction of the locking claw lever 71, elastically supporting the locking claw lever 71 in both directions.

The locking pawl spring 92 is fitted to the fifth pin 73*a* of the locking pawl lever 73 to elastically support the locking pawl lever 73 in a direction in which the locking support end portion 86 of the locking pawl lever 73 engages with and supports the locking engagement end portion 82 of the locking claw lever 71.

That is, the locking pawl spring 92 is supported at one end portion by a second spring bracket B2 formed on the first guider 51 of the pop-up guide portion 50, and is supported at the other end portion by the locking protrusion end portion 87 on the locking pawl lever 73, elastically supporting the locking pawl lever 73 in one direction thereof.

The locking pawl link spring 93 is fitted to the fifth pin 73*a* of the locking pawl lever 73, in correspondence with a lower portion of the locking pawl spring 92, and elastically supports the locking pawl link lever 75 in a direction in which one side of the locking pawl link lever 75 protrudes into the guide groove 55.

That is, the locking pawl link spring 93 is provided in a state in which one end portion thereof is supported by an edge portion on the first guider 51 of the pop-up guide portion 50 and the other end portion thereof is fitted penetrating through an end face of the locking pawl link lever 75, elastically supporting the locking pawl link lever 75 in both directions.

Furthermore, the rebound locking portion 70 further includes a locking claw damper 94 and a locking pawl damper 95.

The locking claw damper 94 is provided on one side of the first guider 51 of the pop-up guide portion 50, in correspondence with one side surface of the guide end portion 83 of the locking claw lever 71, and supports one side surface of the guide end portion 83 of the locking claw lever 71 to suppress one-way rotation while reducing contact noise.

The locking pawl damper 95 is provided on the other side of the first guider 51 of the pop-up guide portion 50, in correspondence with one side surface of the locking protrusion end portion 87 of the locking pawl lever 73, and supports the locking protrusion end portion 87 of the locking pawl lever 73 to suppress one-way rotation while reducing contact noise.

Hereinafter, operations by stages of the door latch device for a vehicle according to the various exemplary embodiments of the present disclosure will be described with reference to FIGS. 9 to 11.

Figure 9:
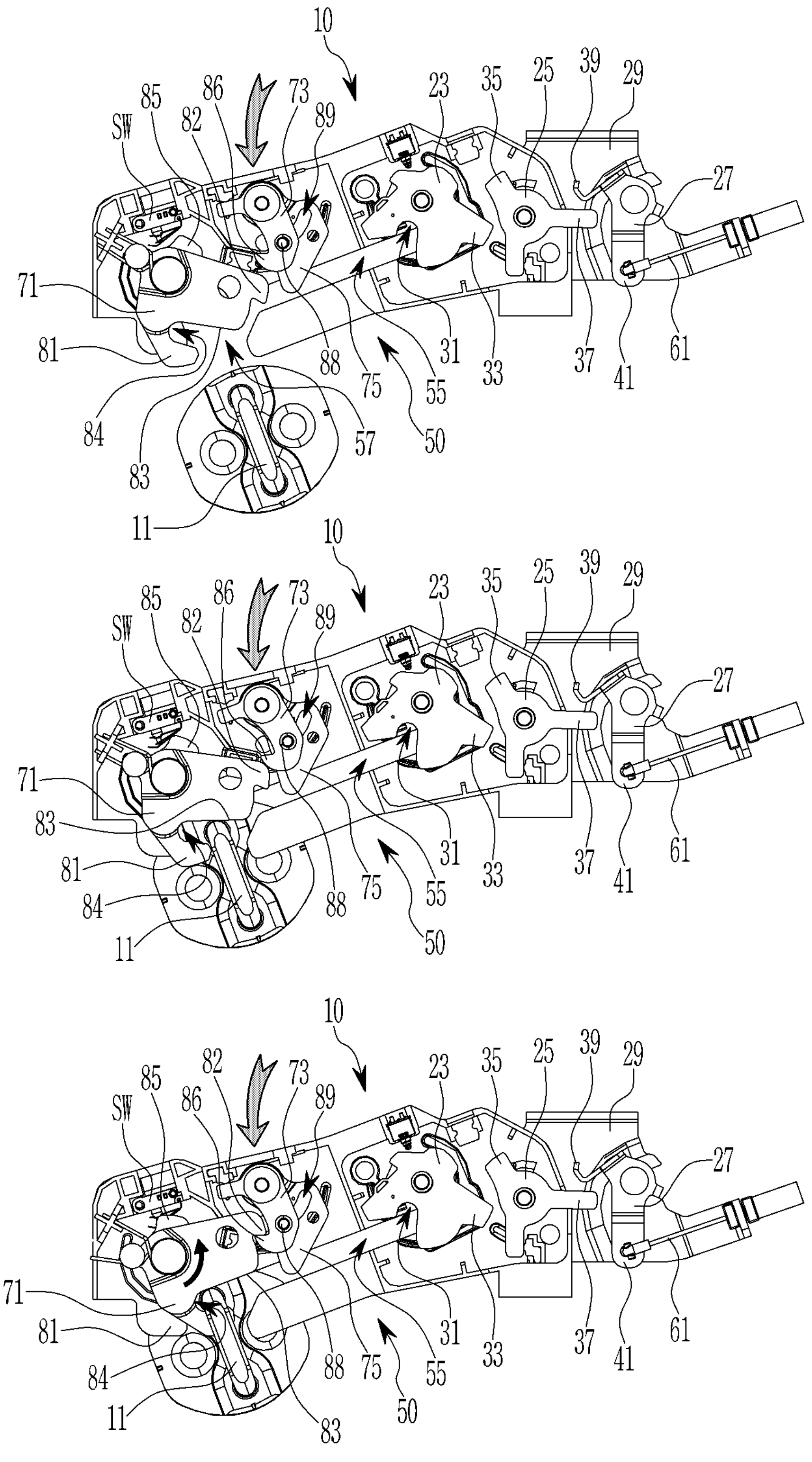
FIG. 9, FIG. 10 and FIG. 11 are plan views showing operating states by stages of the door latch device for a vehicle according to the various exemplary embodiments of the present disclosure.
Figure 10:
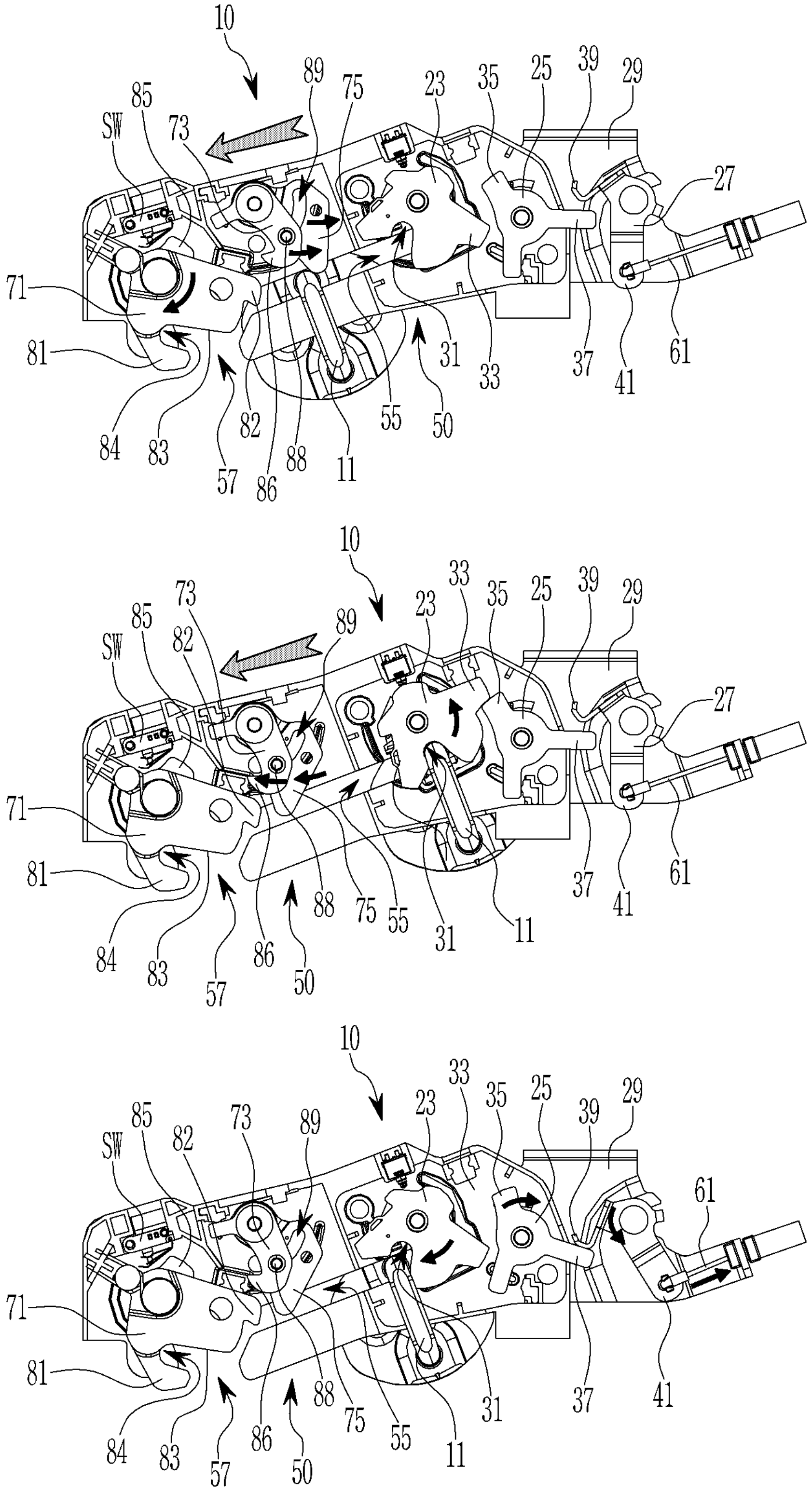
Figure 11:
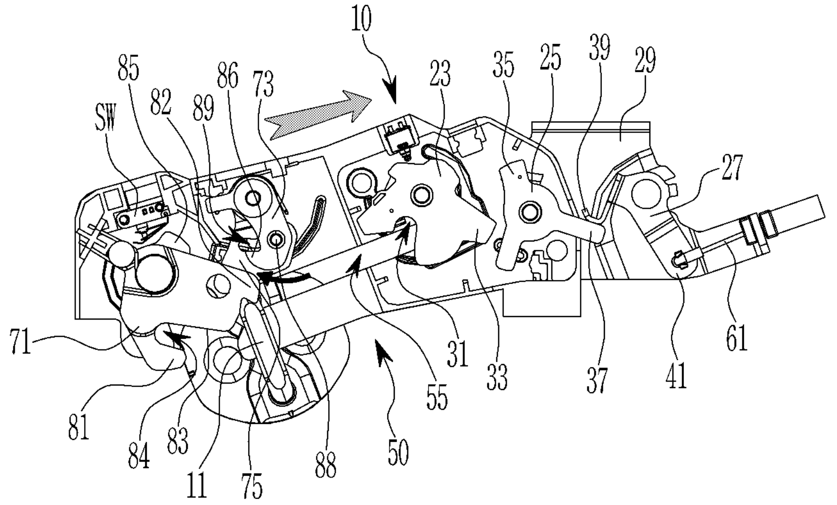
Figure 11:
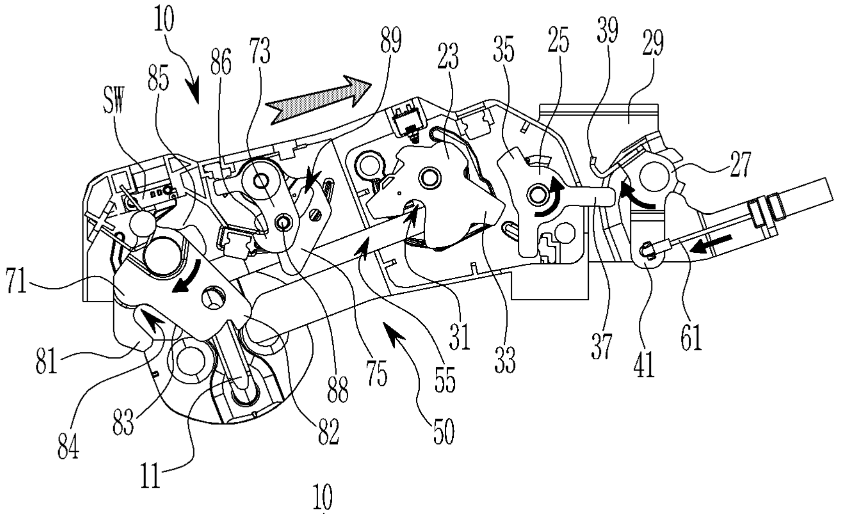
Figure 11:
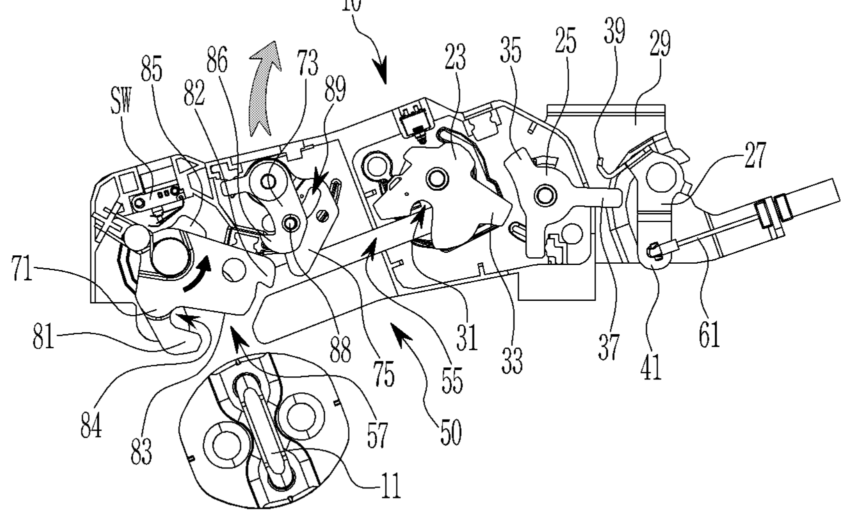

FIG. 9, FIG. 10 and FIG. 11 are plan views showing operating states by stages of the door latch device for a vehicle according to the various exemplary embodiments of the present disclosure.

First, a step ST1 of FIG. 9 shows a process in which the door latch device 10 starts a swing closing operation while swinging toward the striker 11 by the swing closing operation in a state in which the rear door is open.

A step ST2 of FIG. 9 shows a process in which the striker 11 enters the entrance 57 of the guide groove 55 as the swing closing operation of the rear door proceeds.

A step ST3 of FIG. 9 shows a state in which the swing closing operation of the rear door is completed, the striker 11 is inserted into the locking groove 84 of the locking claw lever 71, and the door latch device 10 is locked in the rebound direction thereof.

In the instant case, the locking claw lever 71 rotates with locking the striker 11 through the locking end portion 81, so that the locking engagement end portion 82 is engaged on the locking support end portion 86 of the locking pawl lever 73 and rotation thereof is restricted. As a result, the door latch device 10 remains locked in the rebound direction thereof.

In the present state, the locking claw lever 71 causes the switch actuating end portion 85 to actuate the switch SW to allow a swing closing operation of the striker 11 to be recognized as completed.

A step ST4 of FIG. 10 shows a process in which as the pop-up closing operation of the rear door proceeds, the striker 11 slides along the guide groove 55 to push one side of the locking pawl link lever 75 backward to rotate the same, and accordingly, the locking release pin 88 comes into contact with the internal end portion of the slot 89 to rotate the locking pawl lever 73 in the same direction as the locking pawl link lever 75.

In the instant case, the locking support end portion 86 of the locking pawl lever 73 separates from the locking engagement end portion 82 of the locking claw lever 71, and therefore, the locking claw lever 71 is returned to its initial position by the locking claw spring 91.

A step ST5 of FIG. 10 shows a state in which the pop-up closing operation of the rear door is completed and the striker 11 is restrained in the restraining groove 31 of the claw lever 23 on the latch portion 20.

In the instant case, as the striker 11 completely passes the locking pawl link lever 75, the locking pawl lever 73 and the locking pawl link lever 75 are returned to the initial positions by the locking pawl spring 92 and the locking pawl link spring 93, respectively.

In the present way, the closing operation of the rear door is completed by the swing operation and the pop-up operation of steps ST1 to ST5.

Meanwhile, a step ST6 of FIG. 10 shows a state in which, when the connecting end portion 41 of the actuating lever 27 is pulled through the latch handle wire 61, the actuating lever 27 rotates and the actuating end portion 39 pushes the release end portion 37 of the pawl lever 25 to rotate the pawl lever 25.

In the instant case, the support end portion 35 of the pawl lever 25 is separated from the engagement end portion 33 of the claw lever 23, and therefore, the claw lever 23 is returned to its initial position thereof.

Accordingly, the striker 11 becomes movable from the restraining groove 31 of the claw lever 23 along the guide groove 55 of the pop-up guide portion 50, so that the pop-up opening operation of the rear door may be achieved.

A step ST7 of FIG. 11 shows a process in which as the pop-up opening operation of the rear door proceeds, in which the striker 11 slides along the guide groove 55 of the pop-up guide portion 50, the striker 11 enters the inside of the guide end portion 83 of the locking claw lever 71 and not the locking groove 84.

In the instant case, the locking pawl link lever 75 is pushed forward and is rotated by the striker 11, but the locking release pin 88 can move inside the slot 89 without interference, so that the locking pawl lever 73 does not rotate.

A step ST8 of FIG. 11 shows a state in which the pop-up opening operation of the rear door, in which the striker 11 slides along the guide groove 55 of the pop-up guide portion 50, is completed.

In the instant case, the striker 11 pushes the locking claw lever 71 outwardly from the inside of the guide end portion 83 and rotates the same, and is at a position where the swing opening operation is possible.

A step ST9 of FIG. 11 shows a process in which the rear door is configured to perform the swing opening operation.

In the instant case, the striker 11 comes out of the entrance 57 of the pop-up guide portion 50, and at the same time, the locking claw lever 71 is returned to its initial position by the locking claw spring 91.

Next, a configuration of a door latch device for a vehicle according to various exemplary embodiments of the present disclosure will be described with reference to FIG. 12, FIG. 13 and FIG. 14.

Figure 12:
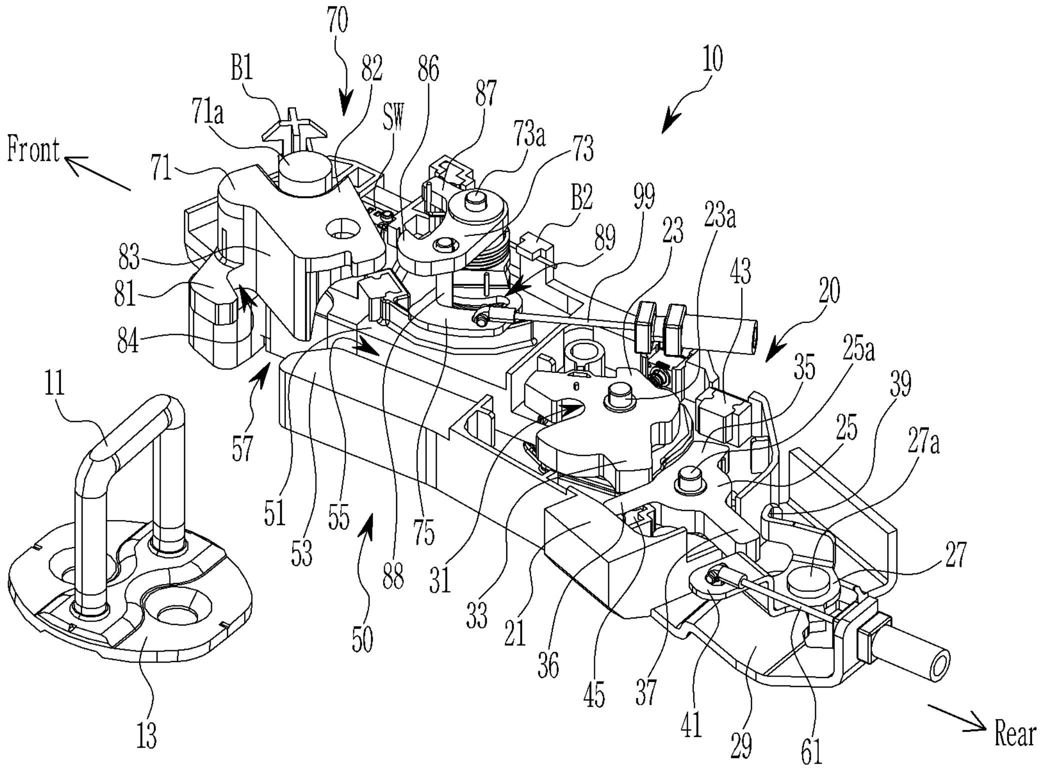
FIG. 12, and FIG. 13 are perspective views of a door latch device for a vehicle according to various exemplary embodiments of the present disclosure.
Figure 13:
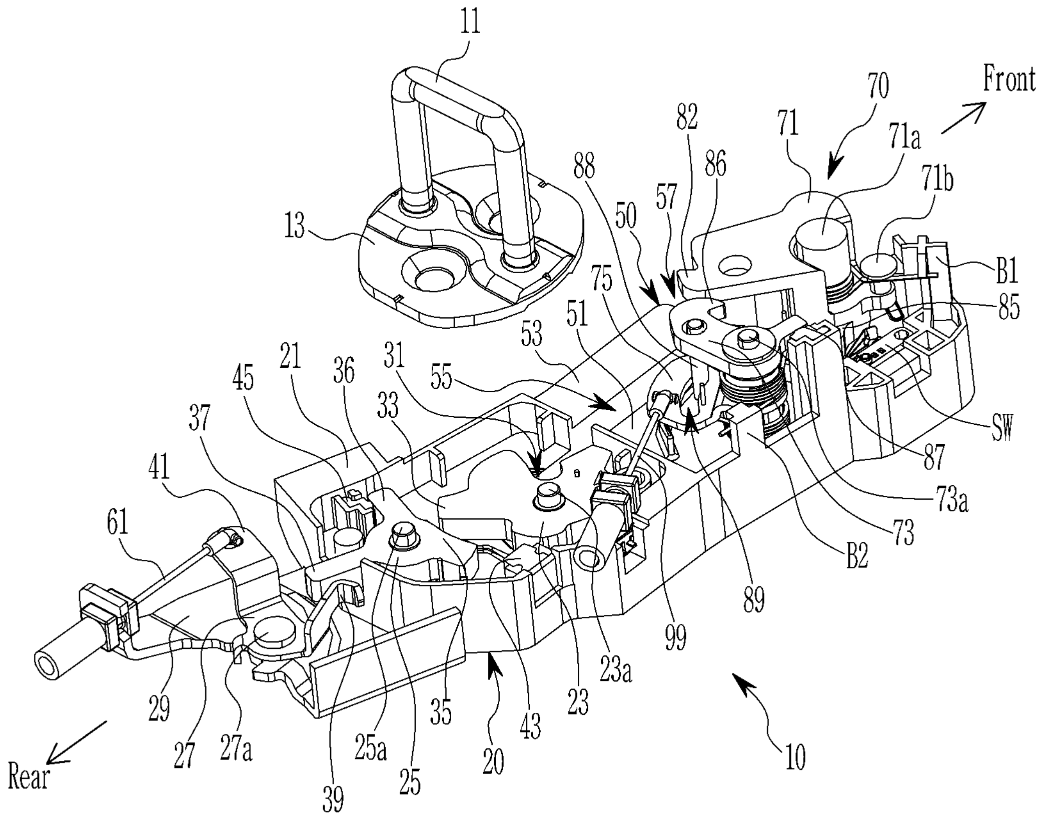
Figure 14:
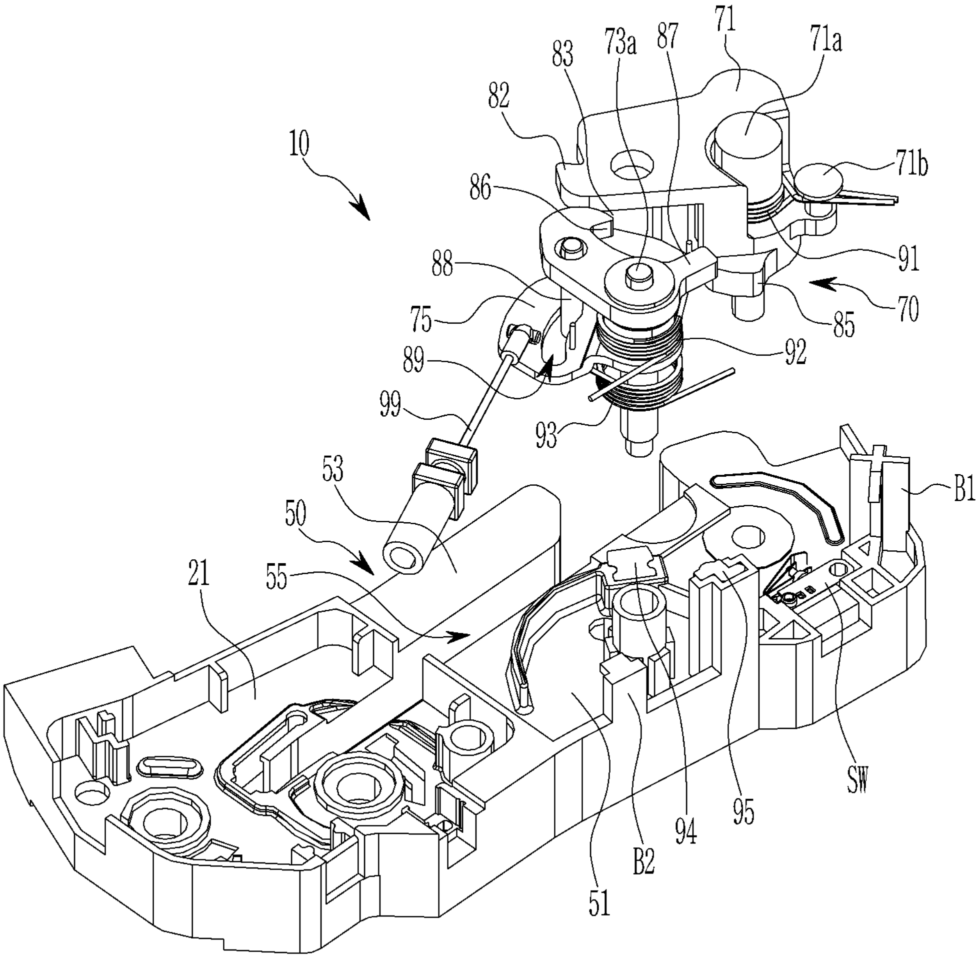
FIG. 14 is a perspective view of a rebound locking portion applied to the door latch device for a vehicle according to the various exemplary embodiments of the present disclosure.

FIG. 12, and FIG. 13 are perspective views of a door latch device for a vehicle according to the various exemplary embodiments of the present disclosure. FIG. 14 is a perspective view of a rebound locking portion applied to the door latch device for a vehicle according to the various exemplary embodiments of the present disclosure.

The configuration of the door latch device 10 for a vehicle according to the various exemplary embodiments of the present disclosure is different from the locking pawl link lever 75 of the rebound locking portion 70, as compared with the configuration of the various exemplary embodiments of the present disclosure. All the other configurations are the same, and detailed description of the configurations are thus omitted.

That is, similarly, in the rebound locking portion 70 according to the various exemplary embodiments of the present disclosure, the locking pawl link lever 75 is rotatably provided on the other side of the pop-up guide portion 50 through the fifth pin 73*a*, together with the locking pawl lever 73, and is formed on an end face with the slot 89 in which the tip portion end portion of the locking release pin 88 is located.

However, differently, the locking pawl link lever 75 is formed so that one side does not protrude into the guide groove 55 of the pop-up guide portion 50, and is connected to a locking handle wire 99 on one side, so that the locking pawl link lever is rotationally actuated through the locking handle wire 99.

Hereinafter, operations by stages of the door latch device for a vehicle according to the various exemplary embodiments of the present disclosure will be described with reference to FIG. 15, FIG. 16 and FIG. 17.

Figure 15:
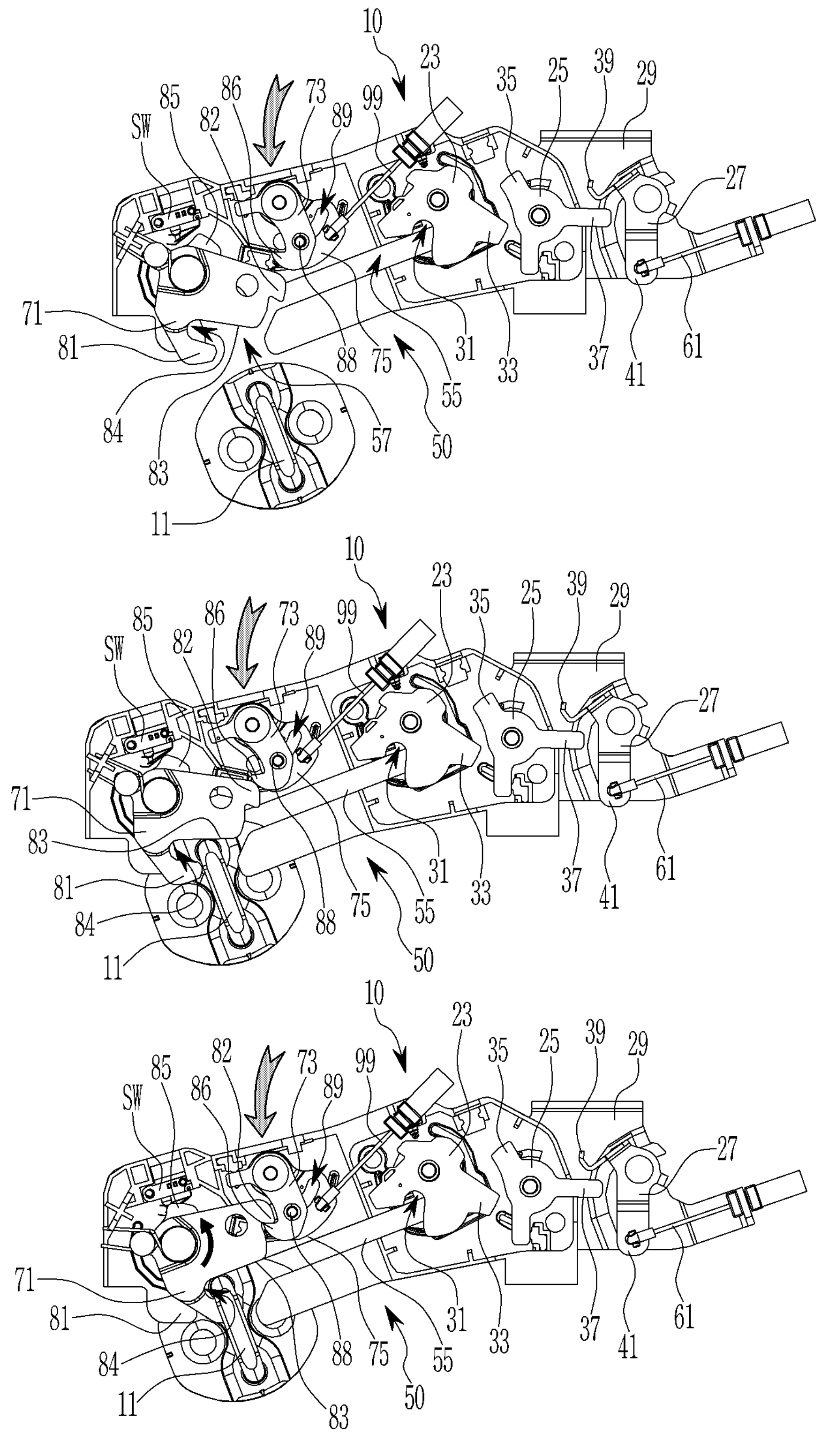
FIG. 15, FIG. 16 and FIG. 17 are plan views showing operating states by stages of the door latch device for a vehicle according to the various exemplary embodiments of the present disclosure.
Figure 16:
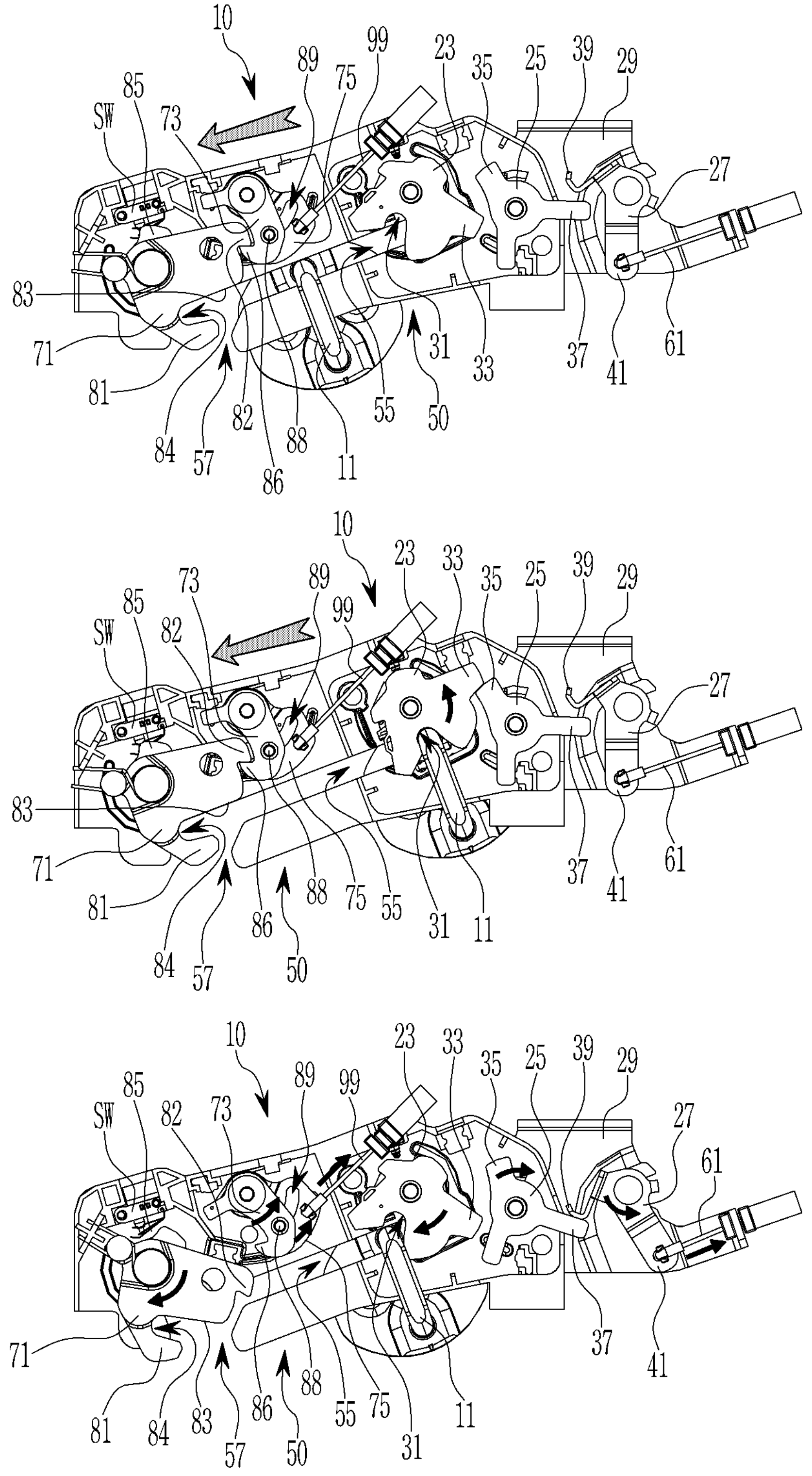
Figure 17:
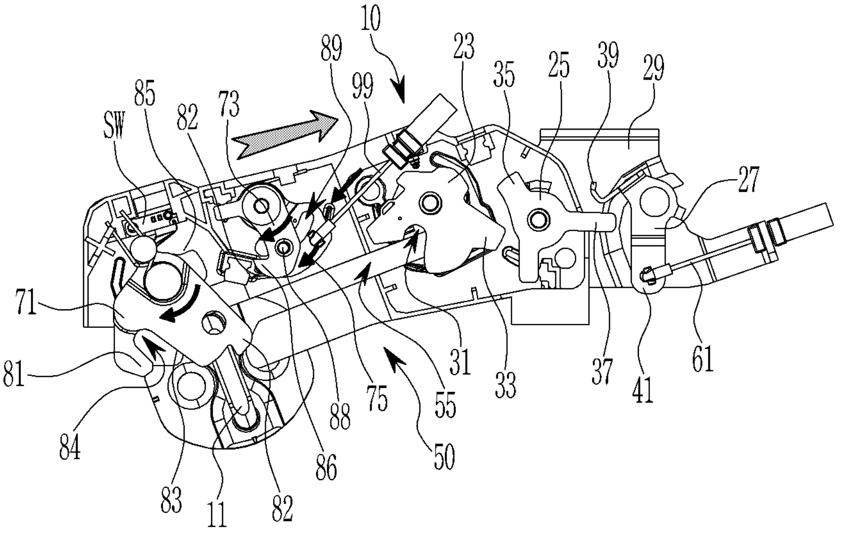
Figure 17:
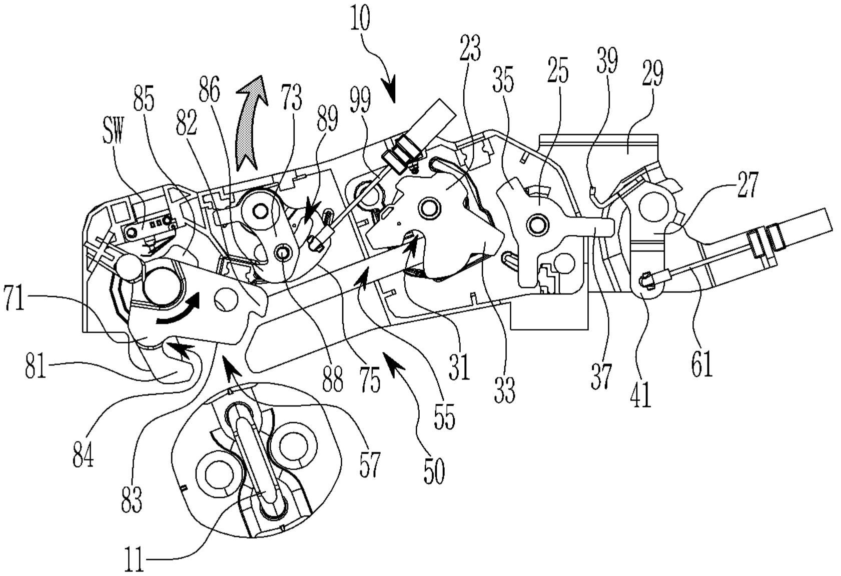

FIG. 15, FIG. 16 and FIG. 17 are plan views showing operating states by stages of the door latch device for a vehicle according to the various exemplary embodiments of the present disclosure.

First, a step ST11 of FIG. 15 shows a process in which the door latch device 10 starts a swing closing operation while swinging toward the striker 11 by the swing closing operation in a state in which the rear door is open.

A step ST12 of FIG. 15 shows a process in which the striker 11 enters the entrance 57 of the guide groove 55 as the swing closing operation of the rear door proceeds.

A step ST13 of FIG. 15 shows a state in which the swing closing operation of the rear door is completed, the striker 11 is inserted into the locking groove 84 of the locking claw lever 71, and the door latch device 10 is locked in the rebound direction thereof.

In the instant case, the locking claw lever 71 rotates with locking the striker 11 through the locking end portion 81, so that the locking engagement end portion 82 is engaged on the locking support end portion 86 of the locking pawl lever 73 and rotation thereof is restricted. As a result, the door latch device 10 remains locked in the rebound direction thereof.

In the present state, the locking claw lever 71 causes the switch actuating end portion 85 to actuate the switch SW to allow a swing closing operation of the striker 11 to be recognized as completed.

A step ST14 of FIG. 16 shows a process in which the striker 11 slides along the guide groove 55 as the pop-up closing operation of the rear door proceeds.

A step ST15 of FIG. 16 shows a state in which the pop-up closing operation of the rear door is completed and the striker 11 is restrained in the restraining groove 31 of the claw lever 23 on the latch portion 20.

In the present way, the closing operation of the rear door is completed by the swing operation and the pop-up operation of steps ST11 to ST15.

Meanwhile, a step ST16 of FIG. 16 shows a state in which, when the connecting end portion 41 of the actuating lever 27 is pulled through the latch handle wire 61, the actuating lever 27 rotates and the actuating end portion 39 pushes the release end portion 37 of the pawl lever 25 to rotate the pawl lever 25.

In the instant case, the support end portion 35 of the pawl lever 25 is separated from the engagement end portion 33 of the claw lever 23, and therefore, the claw lever 23 is returned to its initial position thereof.

Accordingly, the striker 11 becomes movable along the guide groove 55 of the pop-up guide portion 50 to the restraining groove 31 of the claw lever 23, and thus the pop-up opening operation of the rear door may be achieved.

Furthermore, in a step ST16 of FIG. 16, one side of the locking pawl link lever 75 is pulled through the locking handle wire 99 simultaneously with the operation of the latch handle wire 61.

Accordingly, the locking support end portion 86 of the locking pawl lever 73 separates from the locking engagement end portion 82 of the locking claw lever 71, and therefore, the locking claw lever 71 is returned to its initial position by the locking claw spring 91.

In the instant case, when the pulling force of the locking handle wire 99 is removed, the locking pawl lever 73 and the locking pawl link lever 75 are returned to the initial positions by the locking pawl spring 92 and the locking pawl link spring 93, respectively.

A step ST17 of FIG. 17 shows a state in which as the pop-up opening operation of the rear door proceeds, in which the striker 11 slides along the guide groove 55 of the pop-up guide portion 50, the striker 11 enters the inside of the guide end portion 83 of the locking claw lever 71 and not the locking groove 84, and accordingly, the pop-up opening operation of the rear door in which the striker 11 slides along the guide groove 55 of the pop-up guide portion 50 is completed.

In the instant case, the striker 11 pushes the locking claw lever 71 outwardly from the inside of the guide end portion 83 and rotates the same, and is at a position where the swing opening operation is possible.

A step ST18 of FIG. 17 shows a process in which the rear door is configured to perform the swing opening operation.

In the instant case, the striker 11 comes out of the entrance 57 of the pop-up guide portion 50, and at the same time, the locking claw lever 71 is returned to its initial position by the locking claw spring 91.

Therefore, the door latch device for a vehicle according to an exemplary embodiment of the present disclosure includes the rebound locking portion 70 including the locking claw lever 71, the locking pawl lever 73, and the locking pawl link lever 75 on the pop-up guide portion 50 in a vehicle without a B-pillar, so that when the door is subjected to the swing closing operation, the locking end portion 81 on the locking claw lever 71 locks the striker 11 to prevent the door from rebounding.

That is, even when the door is slammed with excessive force, a normal pop-up closing operation may be performed while the striker 11 slides along the guide groove 55 of the pop-up guide portion 50 in a state of being locked in the locking groove 84 of the locking claw lever 71.

Accordingly, damages to the door latch device 10, the hinge portion, the door and the like due to a rebound phenomenon of a door of the related art may be prevented.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door latch apparatus for a vehicle, the apparatus comprising:

a striker fixed to a vehicle body corresponding to one side of a lower portion of a door configured to be opened or closed by a double motion of a pop-up operation and a swing operation through a hinge portion;

a latch portion provided on one side of the lower portion of the door and configured to restrain or release the striker through a claw lever and a pawl lever on a body;

a pop-up guide portion including a guide groove at a predetermined angle on one side of the body of the latch portion to guide one side of the lower portion of the door by the striker at a time of the pop-up operation of the door; and a rebound locking portion provided on the pop-up guide portion, including a locking claw lever, a locking pawl lever, and a locking pawl link lever, and configured, in response that the striker enters the pop-up guide portion while the door is closed by the swinging operation, to lock the striker in a rebound direction by the locking claw lever, wherein the locking claw lever of the rebound locking portion includes:

a locking end portion rotatably coupled to a first side of the pop-up guide portion, formed on a first side of locking claw lever and configured to lock the striker;

a locking engagement end portion formed on a second side of the locking claw lever and configured to restrict one-way rotation; and a guide end portion formed on one side of the locking claw lever between the locking end portion and the locking engagement end portion and configured to guide the pop-up operation of the striker while suppressing one-way rotation.

2. The door latch apparatus of claim 1, wherein the locking pawl lever of the rebound locking portion includes:

a locking support end portion rotatably coupled to a second side of the pop-up guide portion in correspondence with one side of the locking claw lever, formed on a first side of the locking pawl lever and configured to act on the locking engagement end portion; and a locking protrusion end portion formed on a second side of the locking pawl lever and configured to suppress one-way rotation, wherein a locking release pin is downward fixed to an end face of the locking pawl lever.

3. The door latch apparatus of claim 2, wherein the locking pawl link lever of the rebound locking portion includes one side protruding into the guide groove of the pop-up guide portion to be actuated by the striker, rotatably coupled to the second side of the pop-up guide portion together with the locking pawl lever, and including a slot formed on an end face, and wherein a tip end portion of the locking release pin is located in the slot.

4. The door latch apparatus of claim 3, wherein the locking claw lever includes a locking groove formed between the locking end portion and the guide end portion and facing an entrance of the guide groove.

5. The door latch apparatus of claim 3, wherein the locking claw lever includes a switch actuating end portion protruding on an opposite side to the locking end portion and configured to actuate a switch on the pop-up guide portion.

6. The door latch apparatus of claim 3, wherein the rebound locking portion further includes:

a locking claw spring fitted to a pin of the locking claw lever and configured to elastically support the locking claw lever in first and second directions;

a locking pawl spring fitted to a pin of the locking pawl lever and configured to elastically support the locking pawl lever in a direction in which the locking support end portion of the locking pawl lever supports the locking engagement end portion of the locking claw lever; and a locking pawl link spring fitted to the pin of the locking pawl lever and configured to elastically support the locking pawl link lever in a direction in which one side of the locking pawl link lever protrudes into the guide groove.

7. The door latch apparatus of claim 6, wherein the locking claw spring is configured, in a state of being fitted to the pin of the locking claw lever, to be supported at first and second end portions thereof by a first spring bracket on the pop-up guide portion and to elastically support the locking claw lever in first and second directions by a spring actuating pin on the locking claw lever corresponding to a portion between first and second end portions thereof.

8. The door latch apparatus of claim 6, wherein the locking pawl spring is configured, in a state of being fitted to the pin of the locking pawl lever, to be supported at a first end portion of the locking pawl spring by a second spring bracket on the pop-up guide portion and to elastically support the locking protrusion end portion on the locking pawl lever by a second end portion of the locking pawl spring.

9. The door latch apparatus of claim 6, wherein the locking pawl link spring is configured, in a state of being fitted to the pin of the locking pawl lever, to be supported at a first end portion of the locking pawl link spring on the pop-up guide portion, and to elastically support the locking pawl link lever by a second end portion of the locking pawl link spring fitted through an end face on the locking pawl link lever.

10. The door latch apparatus of claim 3, wherein the rebound locking portion further includes:

a locking claw damper provided to the pop-up guide portion to support the guide end portion of the locking claw lever and to suppress rotation; and a locking pawl damper provided to the pop-up guide portion to support the locking protrusion end portion of the locking pawl lever and suppress rotation.

11. The door latch apparatus of claim 3, wherein the rebound locking portion is configured so that the locking pawl link lever is formed not to protrude into the guide groove of the pop-up guide portion, is rotatably coupled to the second side of the pop-up guide portion together with the locking pawl lever, is formed on an end face with a slot in which the tip portion end portion of the locking release pin is located is formed, and is configured to be rotationally actuated by a locking handle wire connected to one side thereof.

12. The door latch apparatus of claim 1, wherein the door includes a rear door, and wherein the one side of the lower portion of the door is one side of a front of a lower portion of the rear door in the vehicle.

* * * * *